Oct. 9, 1951 O. S. READING 2,570,275
COORDINATE SETTING MACHINE AND MEASURING APPARATUS
Filed Dec. 3, 1948 10 Sheets-Sheet 1
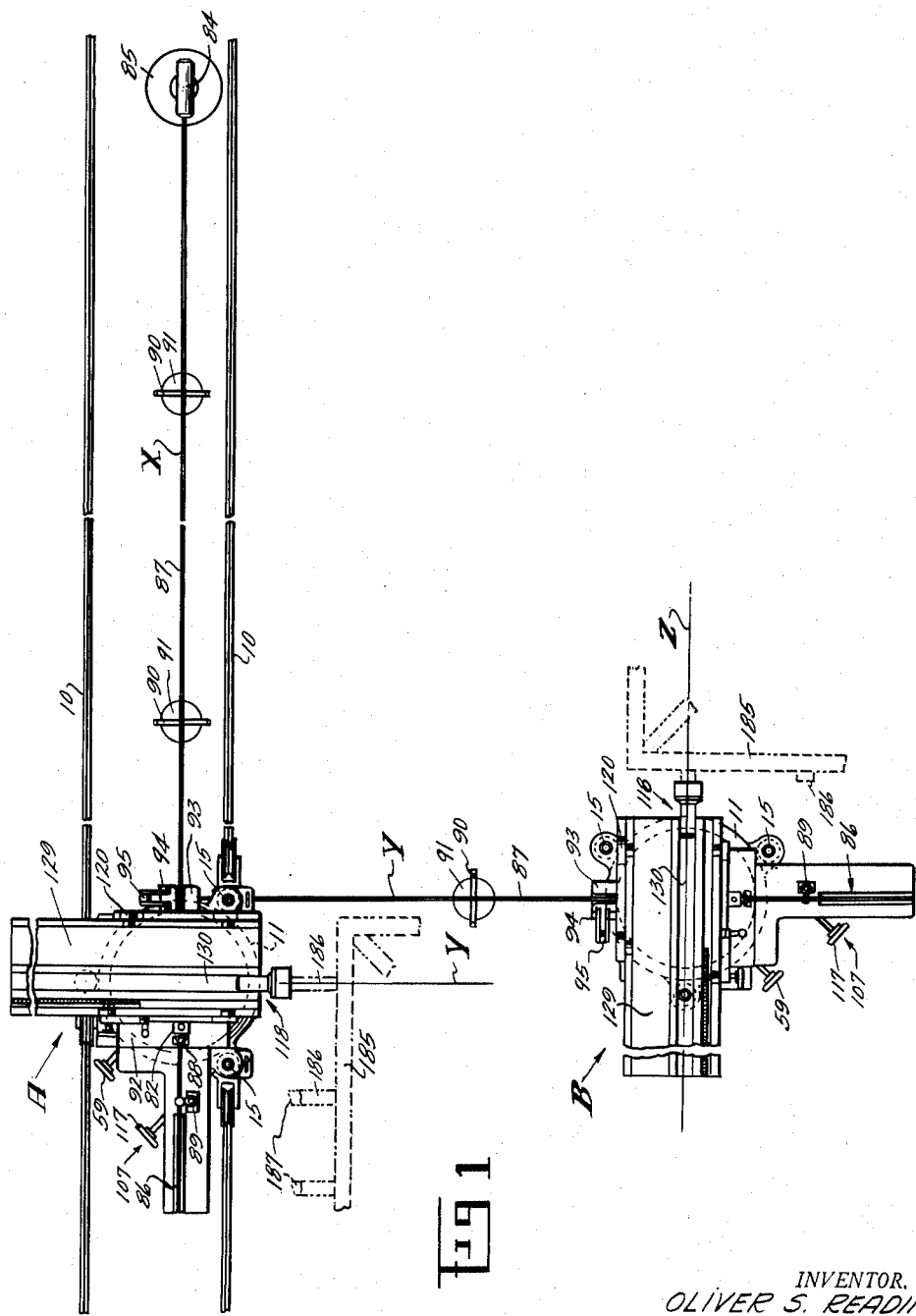
INVENTOR.
OLIVER S. READING
BY
Wade Koontz
Charles H. Wagner
ATTORNEYS

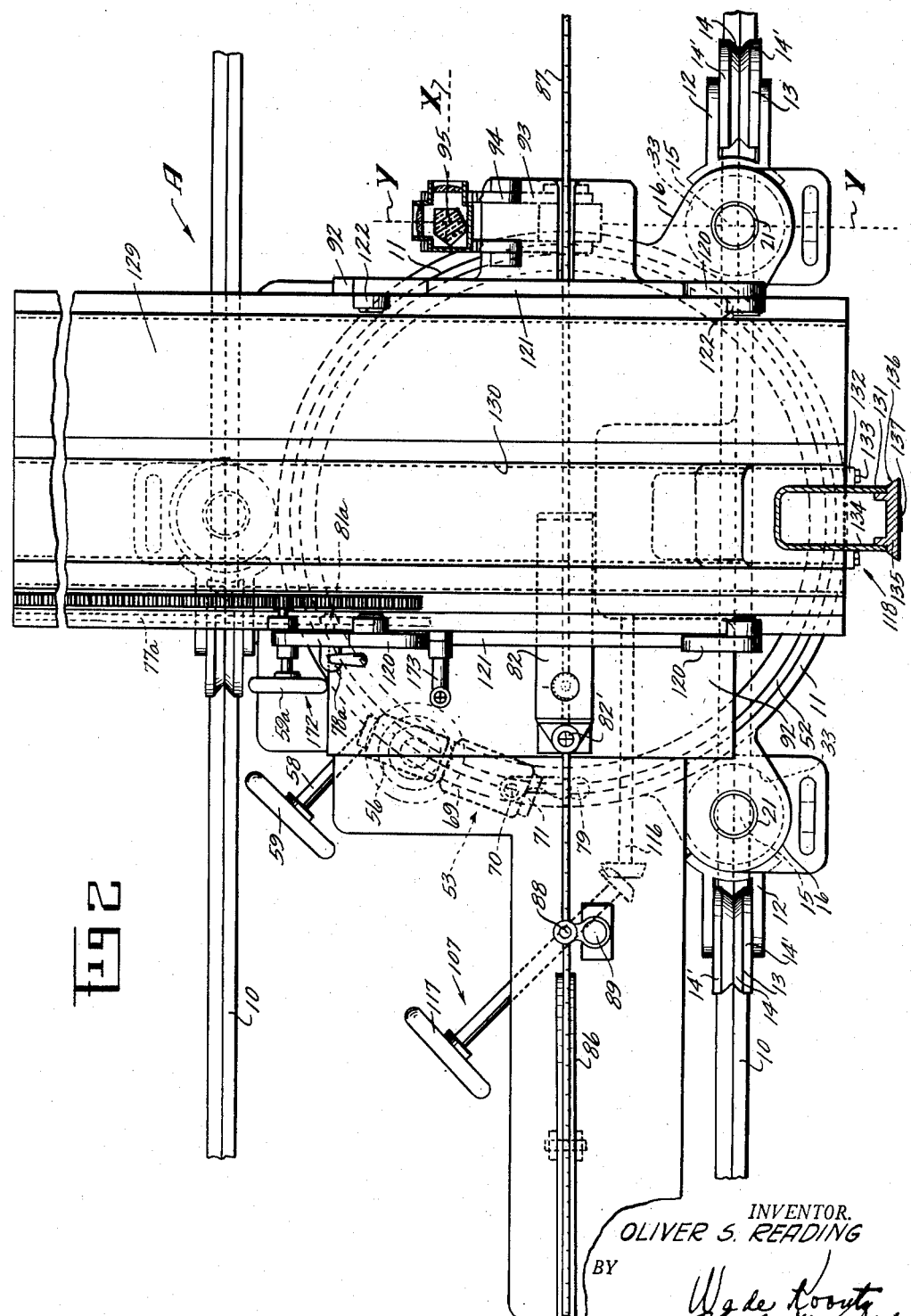

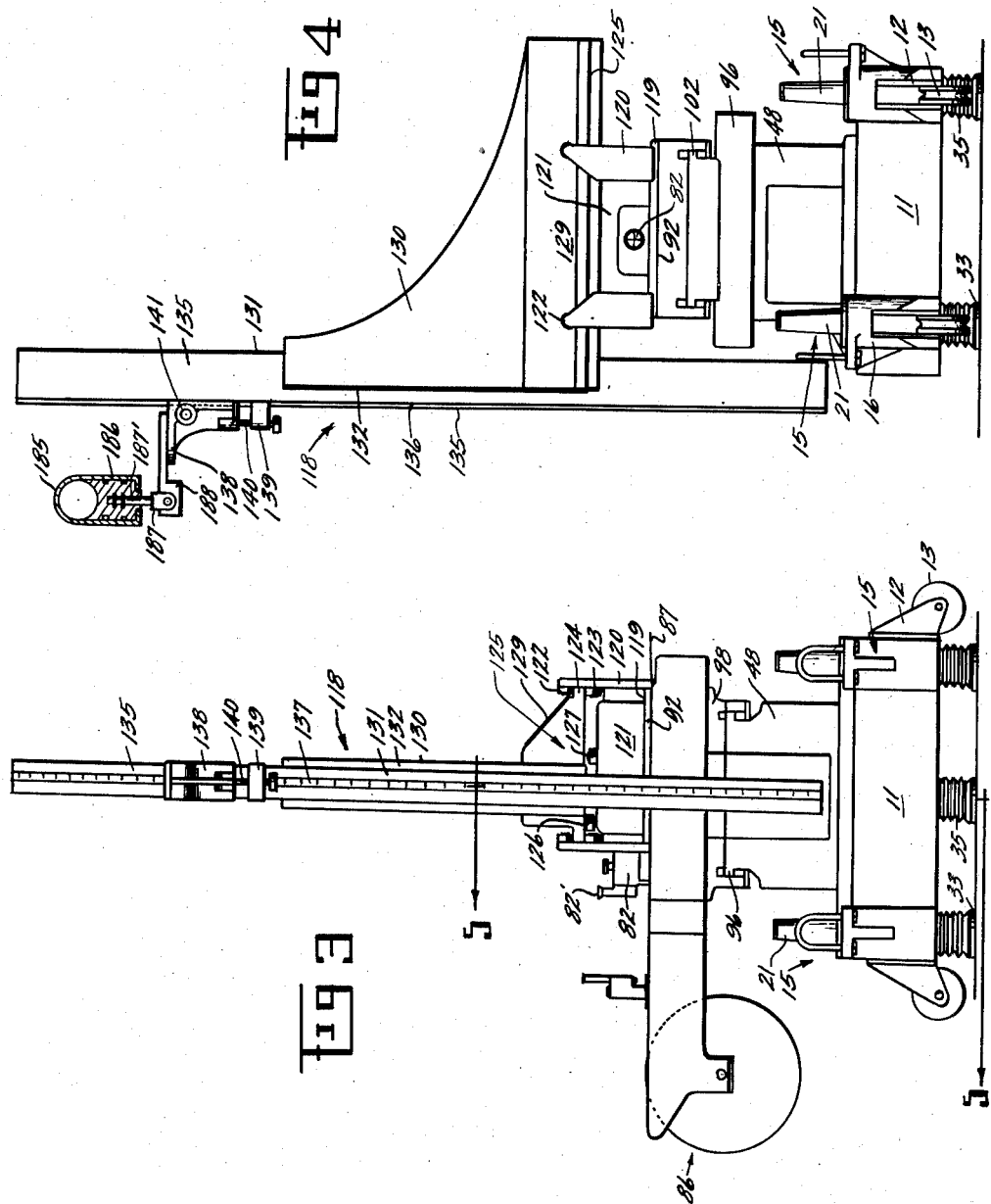

Oct. 9, 1951　　　　　　　　O. S. READING　　　　　　　2,570,275
COORDINATE SETTING MACHINE AND MEASURING APPARATUS
Filed Dec. 3, 1948　　　　　　　　　　　　　　　　　10 Sheets-Sheet 4
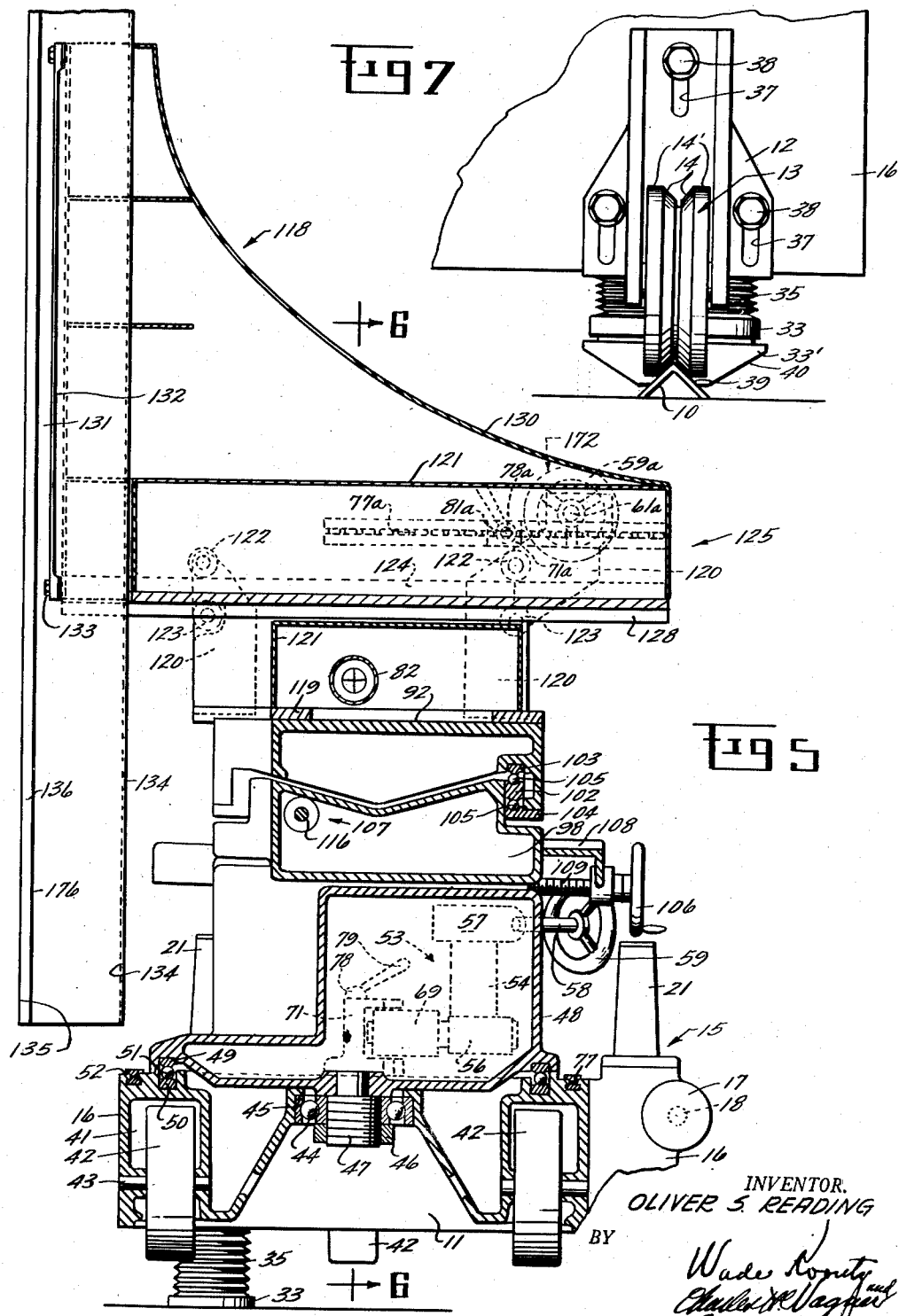

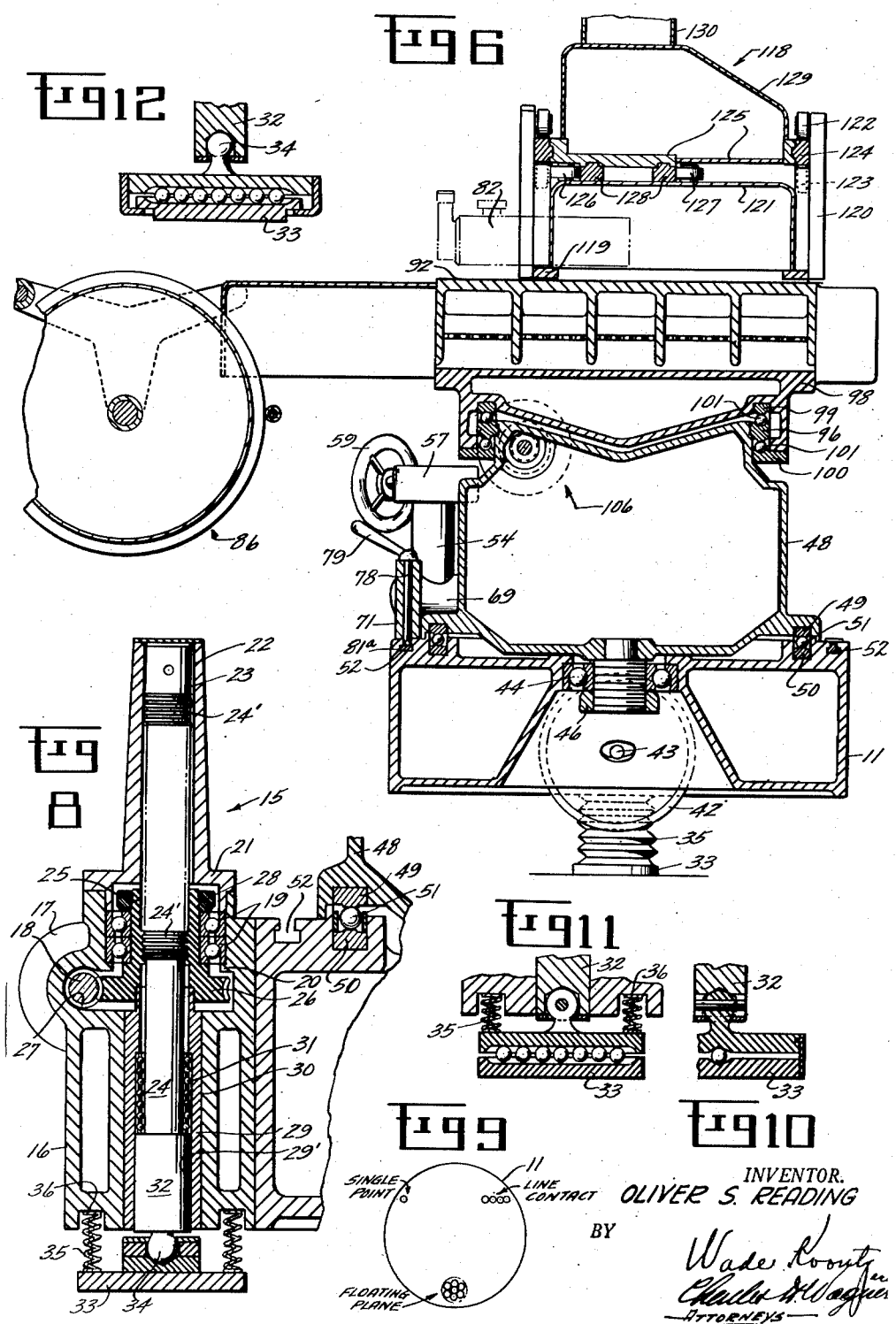

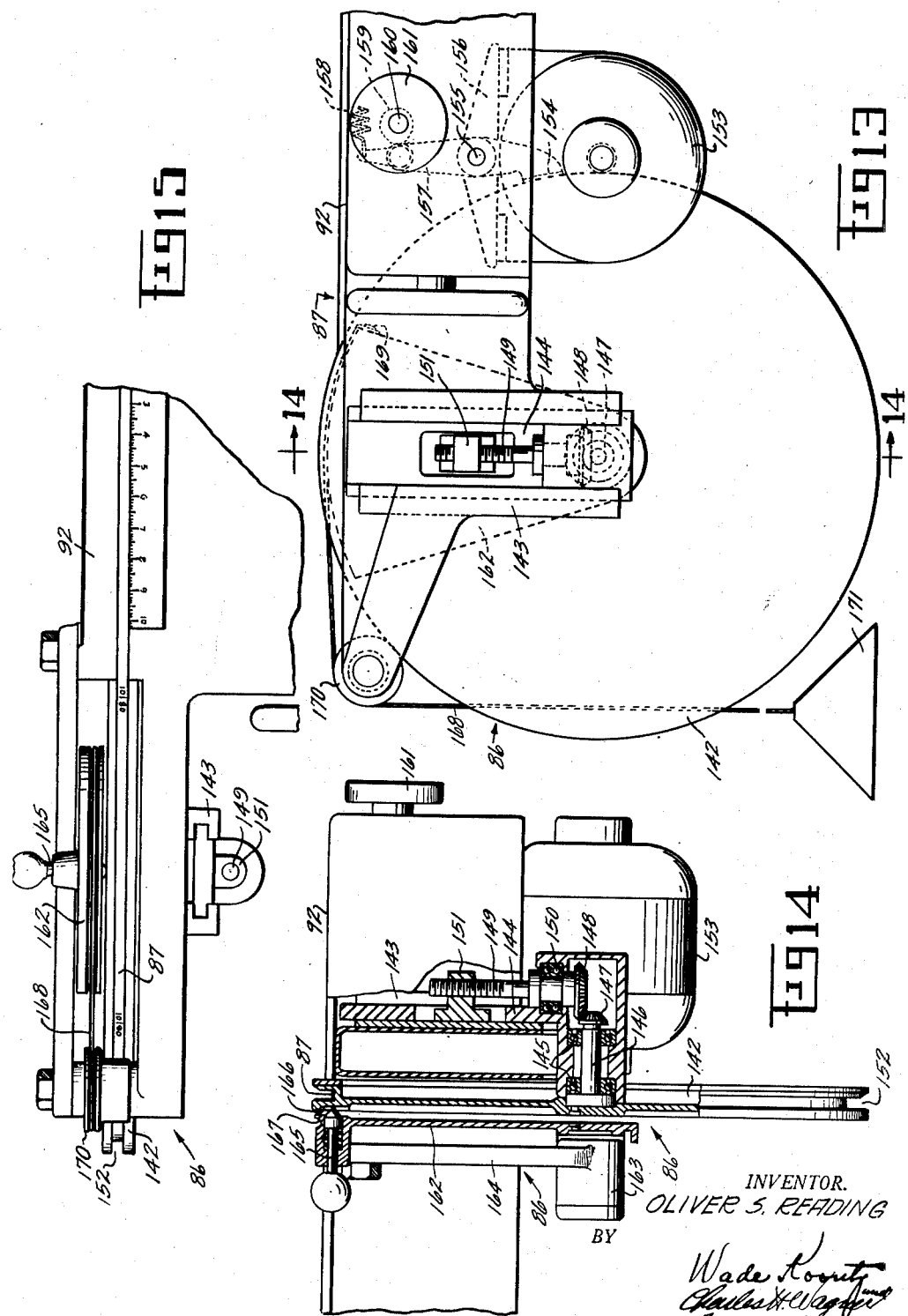

Oct. 9, 1951 — O. S. READING — 2,570,275
COORDINATE SETTING MACHINE AND MEASURING APPARATUS
Filed Dec. 3, 1948 — 10 Sheets-Sheet 7
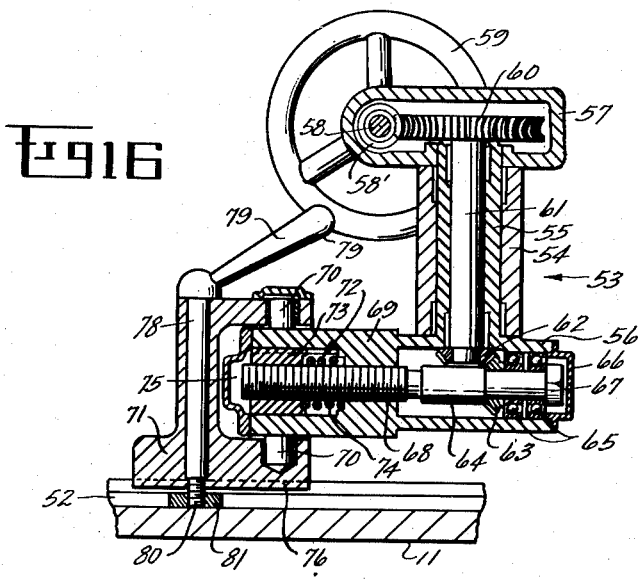
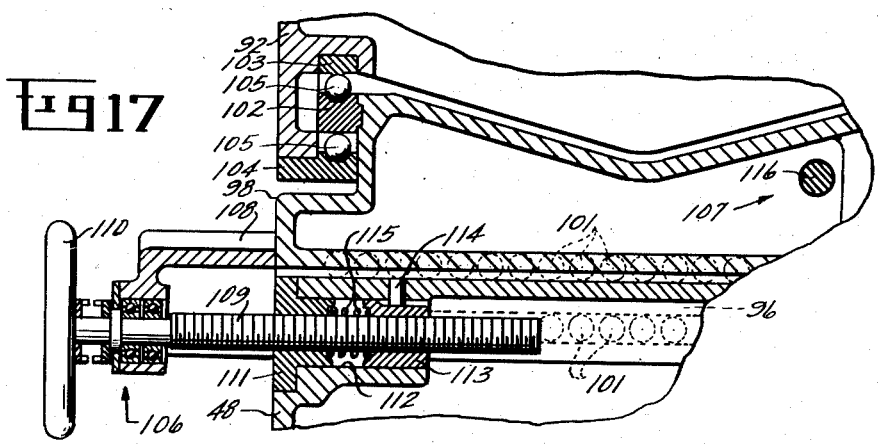
INVENTOR.
OLIVER S. READING

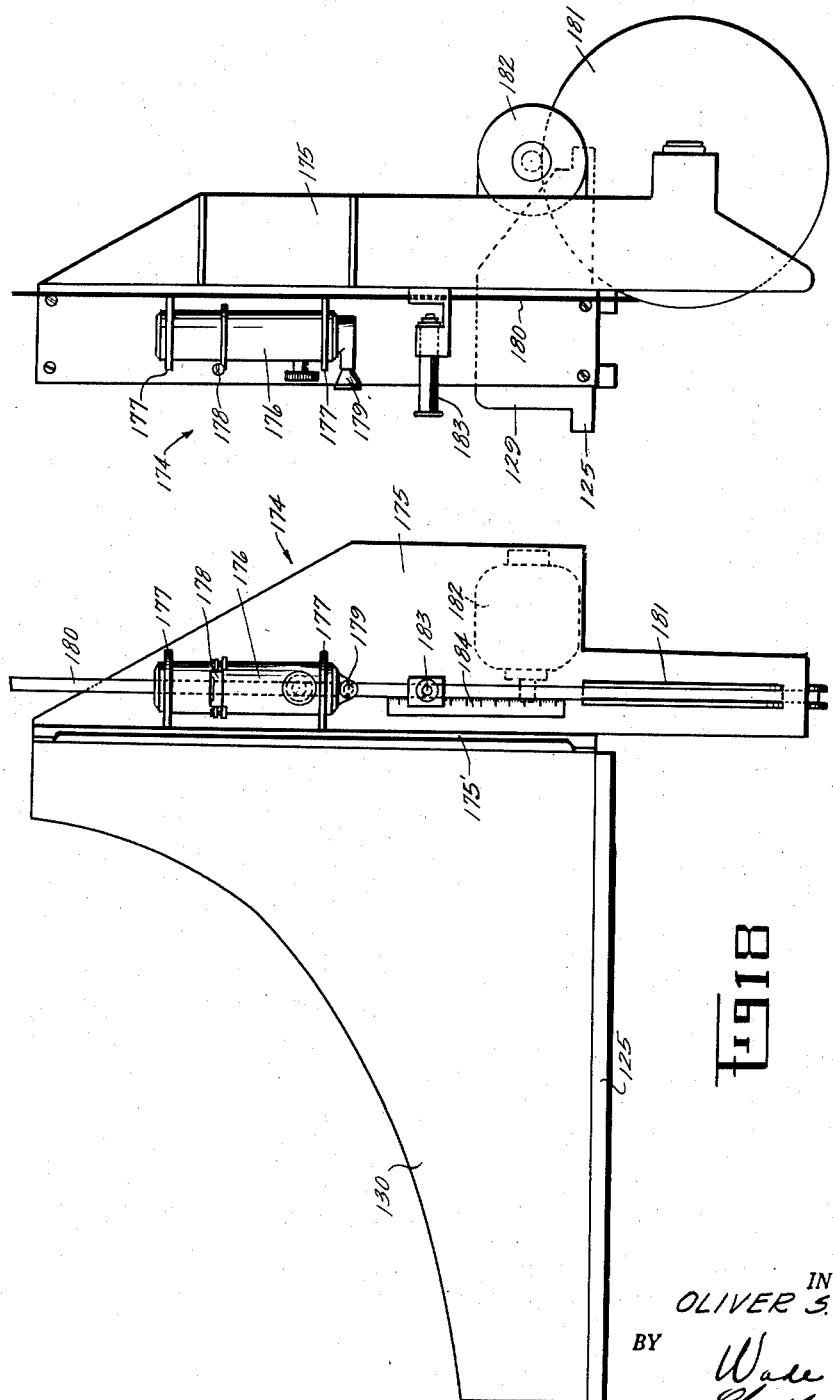

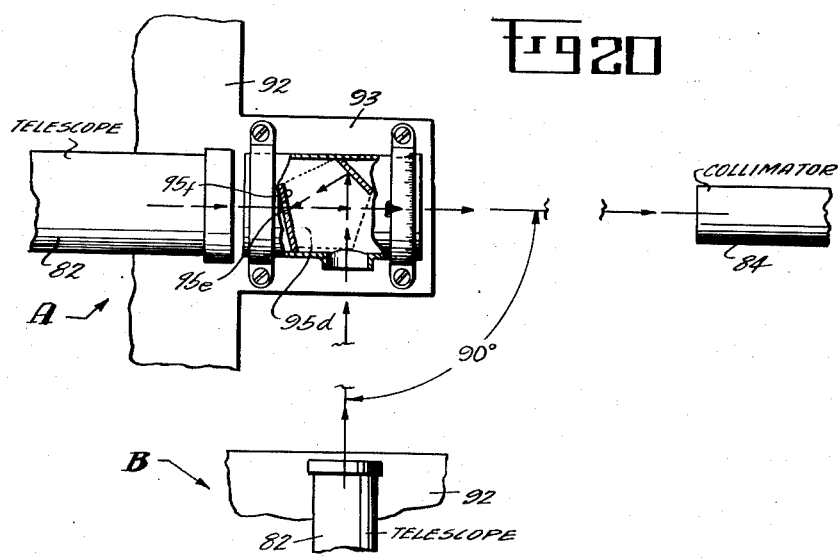
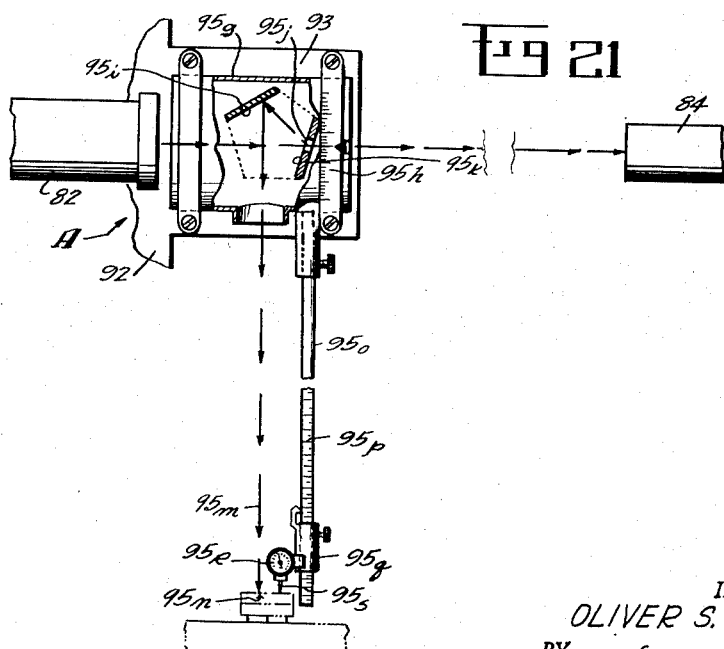

Oct. 9, 1951 O. S. READING 2,570,275
COORDINATE SETTING MACHINE AND MEASURING APPARATUS
Filed Dec. 3, 1948 10 Sheets-Sheet 10
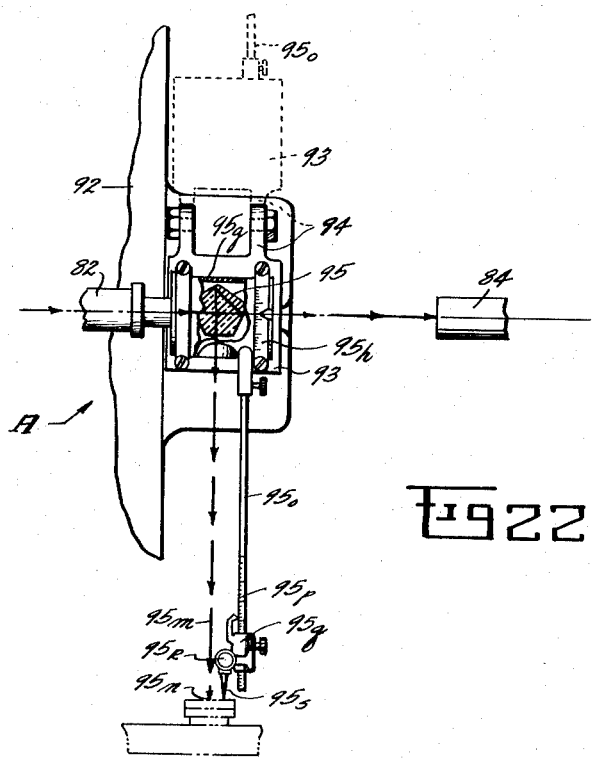
INVENTOR.
OLIVER S. READING
BY
ATTORNEYS Patented Oct. 9, 1951

2,570,275

UNITED STATES PATENT OFFICE 2,570,275

COORDINATE SETTING MACHINE AND MEASURING APPARATUS

Oliver S. Reading, Washington, D. C.

Application December 3, 1948, Serial No. 63,424

22 Claims. (Cl. 33—1)

(Granted under the act of March 3, 1883, as amended April 30, 1928; 370 O. G. 757)

The invention described herein may be manufactured and used by or for the Government for governmental purposes without payment to me of any royalty thereon.

This invention relates to coordinate setting machines and apparatus for accurately determining the relative positions and directions in space of a plurality of angularly associated predetermined coordinates and predetermined points on the coordinates or in offset relation thereto, having for an object the provision of associated relatively fixed optical coordinate direction determining means and associated measuring means for accurately measuring the distance between and along the optically located coordinates to determine points of intersection of the coordinates and reference points along the coordinates from a reference point on one of the coordinates.

A further object of my invention is the provision of improved optical and associated linear measuring means for accurately locating and determining directions, length, and angular relation in space, of a plurality of predetermined angularly related coordinates and reference points or stations on the coordinates relative to a reference point on one of the coordinates, and to determine the positions of stations along the coordinates in offset relation thereto.

A further object is the provision of coordinate determining and "setting" apparatus for establishing the positions in space of a plurality of angularly related predetermined coordinates in which the apparatus includes coordinate axis determining collimator means and cooperating optical sighting means for determining the direction and angular relation in space between given coordinates and linear measuring means and adjustable reference means operatively associated with the optical sighting means for establishing predetermined offset reference points adjacent the coordinates, measured from a reference point on one of the coordinates.

In the fabrication and assembly of large structures composed of individual units or assemblies that are separately fabricated and later assembled in one final assembly, it is highly desirable that all individual units should be made interchangeable. The individual units are conventionally made up with "jigs," or on "jigs." An example, for instance, is in the manufacture of large airplanes used today for military and transport purposes. Individual assemblies, such as fuselages, tailfins, ailerons, and elevators are all manufactured separately on precision jigs, so that in the final assembly all parts or units will fit with precision and be interchangeable with similar or replacement parts. Since measurements often exceeding 100 feet in length are encountered, with requirements that alignment and positioning of the interconnected parts be held often to ±.001", the construction of satisfactory jigs for the construction of individual units for the assemblies, in order to maintain these close tolerances in the manufacture of the units and parts, require accurate skilled labor and rigid precision construction. Direct linear measurement and relative alignment and positioning of the prime reference points or "locator members" on or in the jigs is often so uncertain that large, heavy and expensive "master" gages are often first made and these are set in place in order to accurately establish the important reference points or locater members on the construction jigs. These master gages, while fairly satisfactory in some respects, require highly skilled labor and much time and expense, not only for their manufacture, but to properly place them up in position, and where the same type and size aircrafts are built at a number of relatively distant plants, these master gages must be duplicated for each plant or transported from plant to plant in order to construct the jig frames with sufficient precision to make all interchangeable parts built thereon truly interchangeable with similar parts on the intended aircraft which are built at the same or another plant. Expense and loss of time during shipment of these large, heavy and cumbersome gages from place to place is therefore an important factor restricting their use, also the liability that these master gages or frames may become so warped or damaged in shipment as to destroy the precise relative alignments and accurate positions of the reference stations on any jigs which may be built around the master gages as a foundation, and the structural units built thereon will not fit the intended aircraft structures or be interchangeable.

Another conventional system employed in "setting" assembly jig frame points of "locator members" is the use of theodolites and triangulation methods for determining the angles, elevations, and positions of reference points or locator parts on the jigs, while sighting from a common reference station. This method requires extensive careful computations, also highly skilled technical labor and considerable time is required to correctly establish the proper given reference points on the jig frames.

A further object of my invention is the employment of apparatus and a system to eliminate the requirement for and use of the aforesaid heavy cumbersome master gages and highly skilled technical labor associated therewith by providing a relatively simple coordinate setting apparatus and associated method for establishing collimated lines of sight to accurately locate predetermined coordinate reference lines, and including associated angularly related adjustable collimator means or reflector means to determine the reference directions of given or predetermined coordinates, together with sighting telescope means having fixed, or adjustably fixed sighting relations to certain of the collimators axes to determine the angular relation between given coordinates and the provision of graduated measuring tape means associated with tape tensioning means and precision means for reading the tape graduations to determine the linear spacing between the coordinates and the direction and distance of offset reference points or stations along the coordinates.

A further object is the provision of improved adjusting means for adjusting the optical sighting means and associated collimator means in azimuth and in elevation.

A still further object is the provision of improved coordinate setting apparatus for accurately measuring and determining the angular relation and relative position of any three rectangularly associated coordinates within the range needed for large interchangeable aircraft units and reference points on assembly jigs, capable of setting or checking reference points located in planes at right angles or predetermined angles to a reference or coordinate line and including means for checking and determining the precise positions of similar reference planes.

A further object of my invention is the provision of coordinate setting apparatus in which the measurements and coordinates determined by the apparatus are independent of special alignment of supporting tracks or the stability and angular relation of the foundations on which the apparatus is mounted and does not require the fabrication of a special supporting bracket for each element or locator member to be positioned.

Other objects and advantages of the invention will become apparent from the following description taken in connection with the accompanying drawings in which like reference characters refer to like parts in the several figures.

Fig. 1 is a top plan view, somewhat schematically illustrating my improved coordinate setting apparatus and its method of operation, illustrating two coordinate setting machines for optically determining the positions of three rectangular coordinates and locating offset reference points relative thereto. The jig frames are shown diagrammatically in dotted lines.

Fig. 2 is an enlarged top plan view, illustrating one of the coordinate setting machines shown in Fig. 1 and disclosing penta-prism means for establishing the axis of a second or Y coordinate. The penta-prism is shown in an inoperative position in full lines and in an operative position in dotted lines.

Fig. 3 is a front elevation of one of my coordinate setting machines.

Fig. 4 is a side elevation of the machine illustrated in Fig. 3, showing the same elevated and supported on the elevating and leveling jack screw members.

Fig. 5 is a somewhat fragmentary sectional view taken about on the vertical plane indicated by the line 5—5 in Fig. 3.

Fig. 6 is a transverse sectional view taken approximately on the plane indicated by the line 6—6 in Fig. 5, parts being broken away and shown in section.

Fig. 7 is an enlarged detailed view of one of the track rollers and supporting bracket, part of the supporting base structure being broken away.

Fig. 8 is an enlarged vertical sectional view taken through one of the leveling jacks, parts of the supporting base being broken away and shown in section.

Fig. 9 is a somewhat diagrammatic bottom plan view showing the location of the lifting and leveling jacks on the supporting base and three different types of foot pads for the bottom ends of the jacks.

Figs. 10, 11 and 12 are enlarged vertical sectional views respectively, through the foot pads for the leveling jacks referred to above, the pads in Figs. 10, 11 and 12, providing respectively single point, line contact, and circular anti-friction supporting surfaces.

Fig. 13 is an enlarged fragmentary somewhat diagrammatic side elevation of my measuring tape reel feature, holding brake, and the torque motor for the reel and uniform tensioning means for the tape.

Fig. 14 is a vertical sectional view taken about on line 14—14 of Fig. 13.

Fig. 15 is a top plan view of the tape reel assembly.

Fig. 16 is an enlarged fragmentary detailed view of the azimuth adjustment means and clamp for the pedestal.

Fig. 17 is a fragmentary vertical sectional view of one of the cross feed screws, disclosing the anti-friction bearing arrangement for the transverse cross feedslides.

Fig. 18 is an enlarged detail view of an attachment having optical means for determining the position of a vertical coordinate or reference points along a vertical axis and Figure 19 is a side elevation thereof.

Fig. 20 is a diagrammatic sectional view of a modification showing a penta-mirror arrangement which may be substituted for the penta-prism arrangement.

Fig. 21 is a fragmentary plan view showing a modified arrangement of polar coordinate determining means.

Fig. 22 is a fragmentary plan view, partly in section and similar to Fig. 21 but illustrating the use of a penta-prism, instead of a penta-mirror. The penta-prism support is mounted similar to the support shown in Fig. 21 in that it is rotatably adjustable about the sighting axis of the telescope 82, and is also swingable out of the telescope sighting axis similar to the penta-prism arrangement shown in Fig. 2.

Referring to Fig. 1 of the drawings the letter A indicates a coordinate setting machine of my improved type for locating the X coordinate and the direction and position of the Y and Z coordinates when the Z coordinate is reasonably close to the X coordinate. Fig. 1 also discloses a second coordinate setting machine B which is used in conjunction with the machine A to optically locate and determine the position of a second or Y coordinate relative to the position and direction of the X coordinate and locate a reference point or points on the Y or Z coordinate, the machine B being also employed to locate reference points having a predetermined offset relation to the Y coordinate, and to locate the direction and position of the third or Z coordinate relative to the X coordinate and to an initial reference point on the X coordinate.

In the drawings the reference numerals 10—10 denote spaced parallel tracks, positioned to extend in the general direction of the first or X coordinate. The tracks 10 however do not need to extend precisely parallel to the X coordinate, only reasonably close to the same general direction of the X coordinate. In Figs. 1 and 2 the coordinate setting machine A is formed with a circular base portion 11 having projecting brackets or arms 12 on which are journaled track wheels 13, two of the track wheels bearing on the same track having annular beveled grooves 14 formed to fit and travel on the bevel portions of the tracks 10, the other wheel or wheels having straight cylindrical portions for travel on the flat portions of the track. All of the wheels also have annular cylindrical bearing surfaces 14' located at opposite sides of the beveled groove 14 to permit the wheels to travel on flat surfaces or on the ground.

Suitable leveling and elevating jack screws 15 are mounted in somewhat circular housings 16 projecting from the side of the base 11. Fig. 8 is a vertical sectional view through one of the leveling and adusting jack screws indicated generally at 15, the jack screws being preferably operated by individual motors 17, connected to worm drive shafts 18. The three jack screw structures are equally spaced around the circular base 11 and are arranged for individual or simultaneous actuation in either direction by the energizing of the motors 17 from a suitable switchboard conveniently located on the coordinate setting machine, although the jackscrews 15 may be operated manually by suitable hand wheels operating the worm shafts 18 through suitable reduction gear trains, if desired.

The somewhat circular jackscrew casings 16 are firmly secured to the base 11, having thrust bearings 19 secured in place between an annular shoulder 20 located on the circular housing 16 and the end of a splined retainer cap 21. The cap is splined at 22 to receive splines 23 formed on the end of the screw jack member 24. A nut 25 having a worm gear wheel head 26 is disposed in mesh with a worm 27 formed on the shaft 18. The nut 25 is securely clamped to the inner ball races of the bearings 19—19 by a clamping nut 28. The nut 25 is precision threaded onto screw threads 24' machined on the jack member 24. The lower end of the jack member 15 extends into a counterbored portion 29' of a guide bushing 29, the guide bushing being press-fitted into a central bore 30 formed in the housing 16. Suitable anti-friction bearings 31 are provided between the periphery of the jackscrew shaft 24 and the bushing 29, and retained in place by an enlarged cylindrical head portion 32 formed on the lower end of the screw shaft 24.

A universally swiveled circular supporting foot member 33 is secured to a ball-shaped extremity 34 on the lower end of the jack shaft 24 (as shown in Fig. 8) and a suitable accordion pleated dust guard 35 is secured at one end near the periphery of the foot member 33 and at its other end in an annular groove 36. Referring briefly to Fig. 7, the track wheel brackets 12 may be provided with vertical slots 37 to receive cap screw fasteners 38, permitting vertical adjustments of the track wheels 13 so that they can be elevated to an "out-of-the-way" position when desired.

When the foot members 33 are to be used on the machine A while the same is supported on the tracks 10 by the wheels 13, a special pad or plate 33' is employed having a bevel groove 39 extending diametrically across the lower face of the special pad member 33', the special pad having side beveled portions 40. These special plates 33' may be secured to the foot plates 33 or positioned manually below the jacks after the machine A has been rolled along the tracks 10, to the approximate position where the Y coordinate intersects the X coordinate. Simultaneous rotation of the three jackscrews 24 (Fig. 8) raises or lowers the base 11 of the machine. Independent adjustment of the jackscrews 24 provides means for the leveling the base 11, and of course, firmly supporting the base with the track wheels 13 elevated above the tracks 10.

The coordinate setting machine A, as well as the machine B, (Fig. 5) is provided with three or more roller or wheel receiving recesses 41 in which three or more supporting wheels or rollers 42 are journaled on the journal shafts 43 fixed in the base 11 and extending across the recesses 41 at the same elevation and parallel to each other. One or more of these wheels may be castered.

The cylindrical base 11 is inwardly and upwardly tapered toward its central axis to receive an annular ball bearing member 44 seated against an annular shoulder 45 which is concentric to the axis of the base 11. A nut 46 retains the bearing member 44 on a cylindrical extension or trunnion member 47 formed on an upper pedestal or turntable member 48, having an annular horizontal bearing surface 49 disposed immediately above a similar annular ball race surface 50 on the base 11, the ball races 49 and 50 being concentric to the axis of the trunnion 47, and ball bearings 51 are interposed therebetween for supporting the pedestal member 48 for easy rotation about a vertical axis on the base 11. Surrounding the annular ball race elements 49, 50 and 51 and formed in the base 11 is an annular T-shaped clamping slot 52 for receiving an azimuth adjusting and clamping means, indicated generally at 53 in Fig. 5, as shown in detail in Fig. 16.

The azimuth adjusting means 53 (Fig. 16) comprises a bracket or cylindrical bearing member 54 secured to or formed integral with the pedestal member 48. A sleeve 55 is journaled in the bearing member 54 having a gear casing 56 at its lower end and a worm gear casing 57 at its upper end with a worm shaft 58 journaled therein. Suitable adjusting means are provided for rotating the worm shaft 58, either manually by a handwheel 59 (Fig. 5) or by a reversible motor (not shown) connected in a suitable selectively energized control circuit. The worm shaft 58 has a worm 58' formed thereon meshing with a worm gear 60 fixed on the upper end of a vertical shaft 61 which is journaled in the sleeve bearing member 55. A bevel pinion 62 is fixed to the lower end of the shaft 61 and meshes with a bevel gear 63 keyed to an azimuth adjusting shaft 64 held against axial movement in the gear casing 56 by a pair of thrust ball bearing elements 65, retained in the gear casing 56 and on the shaft 64 respectively, by a retainer cap 66 and a nut 67.

Rotative adjustment of the worm shaft 58 by the handwheel 59 rotates the azimuth adjustment shaft 64 which is threaded at 68 into a threaded clevis 69 pivoted at one end on a vertical pin at 70, in a suitable opening in an azimuth adjustment clamp block 71. The clevis 69 is longitudinally splined at 72 to receive a longitudinally splined nut 73 which is threaded on the threaded portion of the azimuth adjustment shaft 64. A compression coil spring 74 is interposed between the splined nut 73 and an interior shoulder formed in the clevis 69 and concentrically surrounds the adjustment shaft 64, uniformly "spring loading" the azimuth adjustment shaft to eliminate any backlash between the threads of the shaft 64 and nut 73. A cap 75 closes the opening for the nut 73. The clamp number 71 is formed with a guide rib 76 slidable in the entrance of the annular inverted T-shaped slot 52 formed in the upper surface of the base 11 surrounding the pedestal member 48, a clamping bolt 78 being journaled in a vertical bore in the block 71 with a clamping handle 79 on one end and threaded at 80 at the other end. A clamping plate 81 is threaded onto the threaded end 80 the plate 81 extending across the wider portion of the T-shaped slot 52 so that when the clamp bolt 78 is tightened, the rotative adjustment of the screw shaft 64 by the handwheel 59 will adjust the pedestal or turntable 48 in azimuth relative to the base 11.

The machine A, as well as the machine B, has a reference surface or table 92 on which are mounted the reference means for aligning this reference surface in the desired direction and at the elevation with respect to the reference direction of a predetermined coordinate such as the X coordinate (with respect to the machine A), or the Y coordinate (with respect to the machine B). This reference surface or table is provided with transverse feed adjustment means so that after the machine has been brought into an approximate reference position and elevated and leveled to the desired reference level and leveled horizontally, the cross feed means may be adjusted to bring the coordinate determining reference means, such as a sighting telescope 82 into a precise reference position so that its axis, as determined by conventional crosshairs such as used in a gun sighting telescope or in a surveyor's transit, into precise alignment with the reference direction and position of the first or X coordinate determined optically by a collimator 84 best seen in Fig. 1. The collimator 84 is preferably a conventional type and is mounted on a suitable rigid support 85 and is adjustable in azimuth and in elevation to locate the coordinate determining axis thereof in a desired or predetermined reference direction and at a desired reference elevation. The collimator 84 may be of a type similar to that shown in U. S. Patent 1,662,836 in Fig. 1, at 1, having the usual targets at its infinite focus and in front of its objective and illuminating means in the rear for illuminating the crosshairs or the background to establish a line in space coincident with the axis of a collimator.

The support 85 for the collimator 84 may also furnish an initial or zero reference point for measuring along the X coordinate to the intersection of the Y coordinate, and for this purpose the reference table 92 is provided with a tape take-up reel and a measuring tape mechanism indicated generally at 86 with power means for reeling up the measuring tape and for uniformly tensioning a tape 87 between the reel and its connection at the zero point on the X coordinate adjacent the collimator 84. The tape 87 extends across the top of the reference table 92 on which the telescope 82 is mounted and is accurately graduated throughout its length, passing directly under the center of the telescope axis in a vertical plane extending through the X coordinate.

A microscope 88 is fixed above the top surface of the reference table 92, on standards 89, and is employed to read the graduations on the tape 87 during setting adjustments of the reference table to a reference position along the X coordinate. The tape 87 and tensioning reel mechanism 86 will be referred to the latter.

In making extremely long measurements with the tape 87, such as shown in Fig. 1 and extending from the zero point adjacent the collimator 84 to the desired reference position of the machines A or B, the tape will sag. This sag is corrected by compensating allowances determined by calibrations, also similarly placed tape supports, as indicated at 90, free from all tape friction, are used to obtain the necessary precise alignment and freedom for the longitudinal movement of the tape. The tape supports 90 each rest on pedestal base 91 supported on the ground and are each provided with a vertically adjustable column (not shown) having ball bearing journaled crossbar supports at its top for the tape to rest on. The exact vertical position of the crossbars can be easily determined by using a sighting target resting on the top of the crossbars at the desired elevation as determined by the elevated plane of the sighting axis through the telescope 82 above the plane of the tape 87 when the sighting axis thereof is in alignment with the reference axis of the collimator 84.

The reference table or platform 92 is also provided with means for accurately determining the direction and position of the intersecting or Y coordinate. The means employed may be a collimator device similar to the collimator 84, fixed to the top of the reference table 92 at the desired reference angle with respect to the axis of the sighting telescope 82. However, I have illustrated in the drawings a slightly different optical means for establishing the Y coordinate with respect to the axis of the telescope 82 or X coordinate. The reference table 92 has a rigid extension 93 at one end on which is pivoted a penta-prism supporting frame 94, the pivots of which are precision mounted with their axes precisely parallel to the axis of telescope 82, the penta-prism 95 being so arranged as to position the light entrance axis of the penta-prism 95 in alignment with the axis of the telescope 82 when the penta-prism 95 is in use. The penta-prism, will, of course, reflect or refract or project the X coordinate axis of the collimator 84 at an angle of 90°, and the rotatively adjusted position of the penta-prism 95 in its mount or frame 94 will determine the angle, in the plane at right angles to the axis of the collimator 84, of the Y coordinate. Suitably graduated adjusting means may be provided between the pivoted penta-prism frame 94 and the mount or barrel for the penta-prism 95 to determine this angle in a vertical plane.

With the penta-prism assembly 94, 95 swung out of the way, as shown in full lines in Fig. 2, the reference table 92 is adjusted in transverse horizontal planes and elevated or lowered as necessary while sighting through the objective or eyepiece 82' of the telescope until the reference table 92 is adjusted to bring the telescope sighting axis into coincidence with the axis of the collimator 84. The penta-prism frame 94 is then swung into operative position as shown in dotted lines to position the penta-prism 95 in the collimator axis to establish the second or Y coordinate relative to the axis of the collimator 84 by utilizing the refraction of the collimated line of sight from the collimator 84 by the penta-prism member 95.

In order to provide slow or "fine" adjustments of the reference table or platform 92 both parallel and transverse to the sighting axis of the telescope 82 I provide a cross-feed mechanism located between the reference table 92 and the pedestal member 48. Reference being made to Figs. 5 and 6 and 17, of the drawings, parallel horizontal guide rails 96 are securely fixed to the opposite edges of the pedestal 48, each rail having upper and lower ball races extending at the right angles to the axis of the telescope 82. A carriage 98 is mounted thereon having upper and lower parallel guide bars 99 and 100 fixed thereto above and below the rails 96, with rows of ball bearings 101, in carriers, interposed therebetween. The upper surface of the carriage 98, at its opposite edges, is provided with spaced parallel guide rails 102 extending in a horizontal plane parallel of the guide rails 96 and precisely parallel to the axis of the telescope 82. The lower surface of the reference table 92 is ribbed and cross braced for rigidity, having depending parallel flanges at its opposite sides with upper and lower parallel ball race guide bars or rails 103 and 104 located above and below the guide rails 102, a row of carrier mounted ball bearings 105 being disposed between each of the bars 103 and 104 and the guide rails 102. The ball races thus formed are initially fitted so that they will be "preloaded" to avoid play or slack between the balls 101 or 105 and the guide rails 96, 99 and 100 or 102, 103 and 104, to remove any lateral play during longitudinal movements of the reference table 92 in horizontal planes parallel to each other and perpendicular to the azimuth adjustment plane of the pedestal 48 on the base 11. Suitable separate cross-feed adjustment means are provided for adjusting the position of the carriage 98 on the pedestal 48 and for transverse adjustments of the reference table 92 on the carriage 98. One form of precision adjustment means for the carriage 98 is illustrated in Fig. 17, and if desired a similar adjustment means may be used for adjusting the reference table 92 on the carriage 98. The adjustment means for the carriage 98 is indicated generally at 106 while the adjustment means for the table 92 is indicated generally at 107. Referring first to the adjustment means 106, (Fig. 17), the carriage 98 has a bracket extension 108 formed thereon in which a ball bearing journaled fine thread screw shaft 109 is mounted operable by a handwheel 110. The shaft being secured against end play by the said ball bearing journal and a flanged nut 111 is threaded onto the shaft 109 and fixedly secured in a bore 112 formed in the pedestal structure 48. A second nut 113 is threaded onto the adjustment screw shaft 109 as shown in the drawings, slidable in the bore 112 but splined against rotation at 114. A compression coil spring 115 is interposed between the nut 111 and the axially slidable nut 113 to tension the adjustment shaft 109 longitudinally away from the nut 111 and eliminate slack or longitudinal play in the threads between the shaft 109 and the nut 111 of the carriage 98.

The longitudinal feed or adjustment means 107 is similar to the transverse adjustment means 106 but is located between the carriage 98 and the reference table 92. A detailed description thereof should not be necessary other than to indicate that a screw shaft 116 (similar to the shaft 109) is provided with and operated by a hand wheel 117, the direction of the axis of the screw shaft 116 being in a horizontal plane and transverse to the axis of the shaft 109. Adjustment of the azimuth control handwheel 59 rotates the pedestal 48 about its vertical axis on the base 11 and therefore shifts the reference table 92 in azimuth. Adjustment of the hand wheel 110 shifts the reference table 92 and telescope 82 transversely while adjustment of the handwheel 117 shifts the reference table 92, and therefore the telescope 82, longitudinally in the direction of the telescope axis or parallel to the X coordinate relative to machine A, or parallel to the Y coordinate relative to machine B.

Assuming that the Y coordinate is horizontal and extends in a 90° angular relation to the X coordinate, which is also horizontal, and that the reference points or stations to be established are at a considerable distance from the X coordinate, either in offset relation to the Y coordinate or in offset relation to a Z coordinate which intersects the Y coordinate at 90°, the machines A and B are both used to optically establish these coordinates and the refernce points relative thereto. Machine A is first positioned and leveled and the reference table 92 is elevated by simultaneous operation of the three jack screw motors 17 (or suitable handwheels). The handwheels 59 and 110 are manipulated while sighting through the eyepiece 82' of the telescope 82 to establish the collimated line of sight determined by the axis of the collimator 84 when in coincident relation with the sighting axis of the telescope 82. The jack screw adjustment motors 17 are energized individually to level the reference table during the aforesaid adjustment of the reference table and a suitable transverse level indicating means is mounted on the reference table for determining the level or horizontal position thereof in the transverse planes.

The handwheel 117 is then adjusted while observing the graduations on the measuring tape 87 and matching the desired graduation with the cross-hairs of the microscope 88 to adjust the reference table parallel to the X coordinate direction and determine the intersecting point of the Y coordinate as determined by the position of the penta-prism 95 now in inoperative position as shown in Fig. 1 in dotted lines.

When the reference table 92 has been adjusted as aforesaid, and locked or fixed in the said adjusted position the penta-prism mount 94, is then swung into operative position as shown in full lines in Fig. 1. The projected target image from the collimator 84 is now reflected by the penta-prism in a horizontal direction perpendicular to the collimator axis and in the precise direction of the Y coordinate although it may be offset therefrom.

The second coordinate setting machine B is now moved into position and adjusted vertically transversely and in azimuth in the same manner as the A machine to dispose the axis of its telescope 82 in alignment with the aforesaid Y coordinate or collimator target image leaving the penta-prism 95, the handwheel 117 of this machine being adjusted while observing the graduations on the measuring tape 87 of the B machine through its associate microscope 88 until the desired graduation on the tape 87 (between the A and B machines) as read through the microscope 88 is in coincidence with the cross-hairs of the microscope. The measured tape 87 of the B machine is also carried on a uniformly tensioned tape take-up reel 86, one end of the tape being connected to the B machine take-up reel 86 and extending under the sighting axis of its telescope 82 and microscope 88 with a free end of the tape secured to the top of the reference table 92 of the other or A machine at or just below the intersection of the X coordinate with the Y coordinate. Both A and B machines are preferably similar and are provided with separate adjusting and measuring means for determining the position of a vertical or Z coordinate relative to the axis of the telescope 82. This adjusting and measuring means is indicated generally at 118 in Figs. 1 and 2 and will now be described in detail.

Referring to Figs. 1, 2, 5 and 6 the reference table 92 has a supporting plate or frame 119 removably secured thereto, the plate 119 having upwardly projecting arms 120 with a rectangular box-like structure 121 interposed between the arms having its bottom open and provided with diametrically opposite openings in two of its sides to mount the telescope 82 and permit sighting of the telescope toward the collimator 84 (or pentaprism 95). The arms 120 extend above the top surface of the structure 121, each arm having a pair of vertically spaced rollers 122, 123 for receiving therebetween horizontally spaced parallel guide rails 124 fixed to the opposite sides of a horizontally shiftable carriage or ram member 125. Horizontally spaced pairs of fore-and-aft guide rollers 126 and 127 are carried on pivots extending upwardly from the top of the box-like structure 121 and disposed in guiding engagement with spaced parallel longitudinal guide rails 128. One roller of each pair, such as the rollers 122 and 127 are mounted on eccentrically adjustable supports to adjust the distance between the rollers and eliminate slack or play between the rollers and guide bars 124, 127 and 128 and also to preload rollers. The rollers are of precision ball bearing type.

The carriage or ram member 125 is adjustable in a plane precisely perpendicular to the azimuth adjustment axis of the pedestal 48 and perpendicular to the sighting axis of the telescope 82, and therefore perpendicular to the X coordinate, or in other words parallel to the Y coordinate. The carriage or ram member 125 is rigidly formed and includes a heavy baseplate with side flanges and welded thereto is an inverted U-shaped channel member 129, best seen in Figs. 5 and 6, formed of light strong material. Superimposed on the channel member 129 and securely fixed thereto is a channel shaped supporting segment 130 having its front end channeled or recessed vertically to receive a vertical guide rail 131 which is also a stiff hollow fabricated structure, extending in a plane precisely at right angles to the telescope axis, perpendicular to the direction of travel of the upper carriage 125 and parallel to the adjustment axis of the pedestal 48.

The outer face of the channel member or segment 130 extends toward the sides of the vertical guide rail 131 and securing flanges 132 projecting from the opposite side faces of the guide rail 131 are secured to the end faces of the segment 130 by suitable securing means such as cap screws 133. The vertical guide rail 131 comprises a U-shaped sheet metal channel 134 closed by a machined, rigid and straight, guide rail member 135 having oppositely beveled edges 136 with a linear measuring scale 137 therebetween extending along its outer face, graduated vertically above and below a "zero" reference point located in a horizontal plane passing through the axis of the telescope 82, for determining vertical measurements on or offset from the Z coordinate.

Slidably mounted on the beveled guide edges 136 of the vertical guide bar 135 is a supporting shelf or bracket member 138 having a dovetail guide slot formed therein to fit and receive the beveled edges of the guide rail. A clamp member 139 is also slidable along the guide rail 131 having an adjusting screw 140, swiveled therein as seen in the drawings, with the end of the adjusting screw 140 threaded into a threaded socket in the shelf member 138. The shelf carries a microscope 141 having a prism (not shown) for reading the graduations on the scale 137. The horizontal or reference surface of the shelf reference marker 138 is in a horizontal plane passing through the axis of the telescope 82 when the graduations read zero through the microscope 141, so that the upper or reference surface of the shelf member is in the plane of the X coordinate with respect to the machine A Fig. 1, or in the plane of the Y coordinate in connection with the machine B and coincident with the telescope axis at the zero readings.

Referring more particularly to Figs. 13 and 14, relative to the measuring tape take-up reel and associated mechanism for uniformly tensioning the measuring tape, the measuring tape reel is indicated at 142 and is supported for vertical adjustment on a guide bracket 143 depending from the end portion of the reference table 92. A guide block 144 has a suitable bearing 145 in which a tape reel shaft 146 is journaled, and a beveled gear 147 is fixed on the shaft 146 and meshes with a beveled gear 148 on a vertical screw shaft 149 which is journaled in the guide block 144 in bearings 150 which are preloaded to prevent axial movement of the screw shaft 149 relative to the guide block. The vertical screw shaft 149 is received in a threaded arm 151 projecting from the guide bracket 143. A comparatively deep annular tape groove 152 surrounds the tape wheel 142 for receiving a number of wraps of the measuring tape as the tape is wound on the reel. Each rotation of the reel 142 rotates the screw shaft 149 to lower the tape reel an amount equal to one thickness of the tape, and of course, to elevate the wheel correspondingly as the tape is unwound to maintain the horizontal plane of the surface of the tape, where it engages the tape reel, at a constant level relative to the top surface of the reference table 92.

A torque motor 153 is mounted below the reference table structure for maintaining a predetermined torque on the tape reel if desired, also for rotating the tape reel 142 to wind up the tape 87 as it moves inwardly toward the reference table during movements of the coordinate setting machines. The motor 153 may be suspended to gravitate toward the periphery of the tape reel, with a friction drive disk on the motor shaft for engagement with the periphery of the tape reel 142. A brake lever 154 is also provided, pivoted at 155 on a bracket 156, having a tail extension 157 to which is connected a brake engaging spring 158. A brake disengaging cam roller 159 is mounted on a shaft 160 journaled on the reference table 92 and manually rotatable to brake releasing position by a knob 161.

The means for uniformly torqueing the tape reel and tensioning the measuring tape 87 however is best disclosed in Fig. 14 and comprises a pivoted segment 162 fixed on the stub shaft that is journaled at 163 in a bearing support carried by a bracket member 164 fixed to the reference table structure 92. A spring pressed releasable detent member 165 is carried by the outer extremity of the segment 162 and projects into engagement with radial grooves or corrugations 166 around the rim of the tape reel 142. The periphery of the segment 162 is formed with a cable groove 167 (Fig. 14) for receiving a tensioning cable 168 (Fig. 15) secured at one end at 169 to the segment 162 and passing over a pulley 170 and downwardly to a tape tensioning weight 171 secured thereto at the other end.

When the machine A or the machine B is placed in its reference position and the detent 165 is withdrawn from engagement with the tape reel 142, tension may be maintained on the measuring tape 87 by energizing the take-up torque motor 153, or the tape may be held temporarily by engagement of the friction brake member 154. The motor 153 is also used to wind up the tape 87 onto the tape reel 142 to reel in the tape. When the detent 165 is released the detent engaging spring will force the detent outwardly to engage its conical end with one of the radial corrugations 166 on the side of the tape reel and the weight 171, tending to swing the segment 162 about its pivot and will exert a predetermined rotative torque on the tape reel 142, the motor 153 and brake 154 being withdrawn from the reel 142 by suitable positioning of the knob 161. The measuring tape is thus uniformly tensioned to a predetermined extent, once the coordinate setting machine is placed in position. Since the radial distance between the cable groove 167 and the pivotal center of the segment 162, and the radial distance of the measuring tape 87 from the center of the tape reel 142 are substantially equal the number of pounds in weight 161 will equal substantially the pounds pull on the tape between its secured end at the zero point, for instance near the collimator 84, and the point where the tape passes under the microscope 88 on the reference table or platform 92.

Any suitable precision adjusting means may be provided for adjusting the Z coordinate determining structure 118 in its adjustment plane, such as a mechanism similar to that shown in Fig. 16 and disclosed in dotted lines in the upper part of Fig. 5 and as indicated generally at 172. A T-shaped slot 77a like slot 52 may be formed in one side of a rail which is secured to the side of the channel structure 129, and a nut 81a similar to the nut 81 is slidable in the slot 77a, is threaded onto the end of a clamping bolt 78a like the bolt 78, is carried by the adjustment block 71a mounted for longitudinal adjustment in the entrance of the slot 77a in the rail. A clevis nut like nut 69 is pivotally secured to the adjustment block 71a and receives a threaded adjustment shaft like 64 journaled in a casing like the casing 56 carried by a sleeve member in the sleeve 55 but fixed to one of the upwardly projecting supporting arms 120 which carry the rollers 122 and 123. A handwheel 59a like the handwheel 59 is fixed on a shaft 61a journaled in the sleeve member similar to 55, the shaft 61a having a beveled gear similar to gear 62 meshing with a beveled gear similar to gear 63 fixed on the adjustment shaft which is similar to 64. Once the clamping bolt 78a has been tightened to secure the adjustment block 71a to the (rail of the) adjustable carriage 125, rotation of the handwheel 59a will rotate the adjustment shaft 64a to move the carriage longitudinally to any desired adjustment. A suitable scale is provided on the side of the carriage and a microscope 173 is provided on the arm structure 120 for reading the graduations on the scale of the carriage while adjusting the vertical guide rail 131 to the desired reference position relative to the axis of the telescope 82.

Where the vertical or Z coordinate extends materially above the reference table 92 so that the vertical guide rail 131 and adjustable reference shelf member 133 can not be used I preferably provide an attachment (shown in Fig. 18) which is substituted for the guide rail structure 131. This attachment is indicated generally at 174 and comprises a rigid frame structure 175 having the securing flanges 175' for securing the attachment to the face of the channel segment member 130 in a manner somewhat similar to the vertical guide rail structure 131. The frame structure 175 carries a telescope 176 rotatably mounted in brackets 177 secured on the frame structure, with its sighting axis perpendicular to the surface of the reference table 92. The telescope 176 carries a spirit level 178 for checking the plumb position of the telescope axis or Z coordinate. A suitable eyepiece 179 is provided for the telescope with a reflecting prism to change the angle of sight somewhat similar to the telescope 82.

Located adjacent the telescope 176 and parallel to its axis is a vertical measuring tape 180 adjustable in a plane parallel to the telescope axis, a tape take-up and tensioning reel 181 is journaled on the frame structure 175 below the telescope, as seen in Fig. 18 and suitable means for uniformly tensioning the tape 180 (not shown), may be provided, similar to the take-up and tensioning mechanism shown in Fig. 14 and described in detail in conjunction with that disclosure. A tape reel take-up motor 182 will also provide for reeling in the tape when desired. The frame 175 carries a microscope attachment 183 for reading graduations on the tape 180 and this microscope may be mounted for vertical adjustments so as to read the graduations on the tape in conjunction with the vernier scale 184 on the frame 175 adjacent the edge of the tape.

Where a reference point on a Z coordinate is to be located, the measuring tape 180 is drawn past the microscope 183 until the desired graduations appear in registration with the crosshairs of the microscope and the vernier scale 184. The operator sights through the eye piece 179 of the telescope 176 to determine the axis of the Z coordinate (coincident with telescope axis) and the free or outer end of the measuring tape 180 determines the reference position on or offset from the Z coordinate.

Rotation of the telescope through an angle of 180° in the brackets 177 and observation of the position of the bubble in the level 178 will determine whether the axis of the telescope is precisely vertical or not.

In determining the reference positions of reference points on construction jigs with my coordinate setting machines it is preferable to utilize a rigid jig frame such as shown at 185 in Figures 1 and 4, having tubular sockets 186 thereon to receive locator members 187 which members form definite precision reference points on the jig frame for locating important reference or connection points on the structure to be built on the jig frame. These locators are preferably fixed on the jig frame in the sockets 186 by a "cerro-matrix" composition allowed to "freeze" the position of the locators 187 on the jig frames. The locators 187 preferably held in position by improved coordinate setting machine on adapter plates 188 which are supported by the adjustable features of the machine. For instance, the adapter plate 188 may be temporarily secured to the adjustable reference shelf member 138 so that when the carriage 125 and the shelf 138 are properly adjusted in relation to given coordinates the plate 188 will hold the locator 187 in the proper reference position relative to the jig frame 185, and the locator has a supporting stem 187' projecting therefrom, for instance, which extends into the socket 186 of the jig frame 185 so that when the "cerro-matrix" material is introduced into the socket and allowed to harden the locator member will be in the desired reference positions on the jig frame. Reference points on the jig frame 185 may also be established by using my coordinate setting machine and attachments employing polar coordinate adjustments. The reference table 92 may be provided with suitable spaced rotative and "polar" coordinate graduated adjustable penta-prism supports, having a measuring rod whereby polar coordinates may be set or measured. See Fig. 21.

The penta-prism 95 and mount 94 may be modified as shown in Fig. 20 by employing a penta-mirror arrangement 95d which is fixed in position on the table extension 93. The penta-mirror arrangement 95d having a hole 95e in one mirror 95f or its second reflecting surface, so that the telescope 82 can utilize part of its field to view the collimator 84 directly through the hole, while the telescope of machine B is viewing the collimator 84 through the 90° reflection of the penta-mirror arrangement. This makes it possible to view the collimator 84 directly through the telescope 82 on the machine A and at the same time, without shifting the penta-mirror arrangement, to view the collimator 84 through the telescope 82 on the B machine and set the machine B telescope at 90° to the first coordinate determining axis.

Polar coordinates can be determined, and distances along the coordinates by a penta-mirror arrangement as shown in Fig. 21. In this arrangement the penta-mirror barrel 95g is rotatable on the table extension 93 of the machine A about an axis coincident with the axis of telescope 82. Suitable scale indicia 95h being provided between the mount and the barrel 95g, calibrated in polar coordinate angles.

The penta-mirror arrangement is indicated at 95i and 95k, the mirror 95k having a hole 95j therethrough on the telescope axis so that the collimator 84 may be sighted directly, while the field around the hole 95j in the mirror 95k, with the mirror 95i, establishes a 90° line of sight 95m toward a target point 95n on jig frame.

Rotation of the penta-mirror mount 95g, of course, rotates this reflected line of sight 95m in a plane perpendicular to the telescope axis, and to the collimator axis when the latter is coincident with the former. The penta-mirror barrel 95g is provided with an extensible measuring rod 95o having suitable linear measuring indicia 95p and preferably a slider 95q cooperating therewith and carrying a contact gage 95r with a yieldable contact point and plunger 95s for contact with the work or target surface 95n. The exact measurement desired along the polar coordinate from the telescope axis is determined by the radial distance of the contact extremity 95s and the setting of slider 95q on the rod 95o, according to the indicia 95p when the contact gage is reading zero, so that the variations in the polar distance from the "set" position of the slider can be read on the gage 95r.

Fig. 22 illustrates a structure similar to Fig. 21 and therefore similar reference characters are used on the parts thereof which are identical with those shown in Fig. 21. In Fig. 22 a penta-prism 95 is employed instead of the penta-mirror arrangement shown in Fig. 21. The barrel 95g in Fig. 22, containing the penta-prism 95 is mounted for rotative adjustment about the sighting axis of the telescope 82 to dispose the second coordinate axis 95m in any radial direction relative to the sighting axis of the telescope 82 or first coordinate direction as determined by the axis of the collimator 84. Measuring along the second coordinate is accomplished by the rod 95o, scale 95p and the feeler gage 95r. The rod 95o is also utilized to rotate the barrel 95g to adjust the penta-prism and determine the radial direction of the second coordinate 95m, as determined by the scale 95h. The mount 93 in Fig. 22 is hinged in the manner shown in Fig. 2 so that the penta-prism 95 in Fig. 22 can be bodily displaced out of the sighting axis of the telescope 82 when it is desired to check the axis of the telescope 82 with the axis of the collimator 84, as in Fig. 2.

I claim:

1. In a coordinate setting and measuring apparatus, a collimator support, a collimator adjustably fixed on the support having a coordinate determining axis determining the location and direction of a first coordinate, an adjustable support disposed at a distance from the first mentioned collimator, a sighting telescope fixed on said adjustable support having a first coordinate sighting and locating axis, means for adjusting the position of the adjustable support in elevation, and about a vertical axis in azimuth, and in transverse intersecting planes perpendicular to the azimuth adjustment axis while observing the collimator through the telescope, to dispose the coordinate sighting axis thereof in alignment with the coordinate determining axis of the collimator, a second coordinate position and direction determining means fixed on said adjustable support having a second coordinate position determining axis extending in predetermined angular relation to the first coordinate sighting and locating axis of the telescope, for determining the location of the second coordinate relative to the position of the first coordinate when the axis of the second coordinate position determining means is adjusted into alignment with the coordinate position determining axis of the collimator, and linear measuring means carried by the adjustable support for measuring linear distance from a predetermined zero point along the first coordinate determining axis adjacent the collimator to the axis of the second coordinate position and direction determining means.

2. In a coordinate position determining apparatus a rigid support, a collimator fixed thereon having a coordinate position and direction determining axis for determining the location of a first coordinate, a second support adjustable in azimuth about a vertical axis, and adjustable in elevation and in transverse intersecting directions perpendicular to the said vertical axis, coordinate sighting telescope means fixed on said second support having a coordinate position sighting and determining axis, a second coordinate position and direction determining means fixed on the second support in predetermined angular relation to the coordinate position sighting axis of the sighting telescope means, at an angle equal to the angular relation between a predetermined first and second coordinate and, having a second coordinate position determining axis for locating the position in space of the second predetermined coordinate when the sighting axis of the telescope is adjusted into alignment with the coordinate position determining axis of the collimator, extensible tape measuring means carried by the second support for measuring distance from a predetermined zero point on the collimator axis adjacent the collimator to the axis of the second coordinate position and direction determining means, a third support spaced from the second support, a sighting telescope fixed on the third support having a second coordinate position determining sighting axis, means for adjusting the third support in azimuth about a vertical axis, in elevation, and in transverse intersecting directions perpendicular to the last mentioned vertical axis while observing the second coordinate position and direction determining means on the second support to dispose the axis of the last mentioned sighting telescope in alignment with the axis of the second coordinate position and direction determining means, and a third coordinate position and direction determining means carried by the third adjustable support having a third coordinate position determining axis disposed in fixed angular relation to the sighting axis of the second coordinate sighting telescope, extensible measuring tape means carried on the third support and connected to the second support adjacent the first sighting telescope axis for determining the distance between the axis of first coordinate sighting telescope and the third coordinate position and direction determining axis of the third coordinate position and direction determining means.

3. In a coordinate position setting and measuring apparatus for determining the positions of a plurality of intersecting predetermined coordinates and reference points along the coordinates, a rigid support, a collimator fixed thereon having a first coordinate position determining axis arranged to be positioned in alignment with the first predetermined coordinate, a second rigid support, a reference table adjustably mounted on the second support for rotation in azimuth about a vertical axis, vertical adjustment, and horizontally shifting adjustment in transverse intersecting directions, means on the second support for leveling the reference table, rotating the same in azimuth and adjusting the same in transverse intersecting horizontal directions, a sighting telescope fixed on the reference table having a first coordinate position determining sighting axis disposed perpendicular to the vertical axis aforesaid and parallel to one of the transverse adjustment directions of the reference table, for sighting toward the collimator while adjusting the reference table in azimuth, elevation and in said transverse adjustment directions to dispose the coordinate position determining axis of the telescope coincident with the first coordinate, optical second coordinate position determining reflecting means carried by the reference table in predetermined angular relation to the telescoping sighting axis to dispose the same in the first coordinate position determining axis when the telescope sighting axis is coincident with the collimator axis, for reflecting a collimated line of sight from the collimator along a second coordinate position determining axis at a predetermined angle to determine the position and direction of the second predetermined coordinate, and linear measuring means carried by the reference table and extensible in parallel relation to the telescope sighting axis for measuring distance between a selected zero point on the first coordinate adjacent the collimator and the position of the second coordinate position determining axis of the optical reflecting means.

4. In a coordinate position setting and measuring apparatus for determining the positions in space of a plurality of predetermined intersecting coordinates and reference points along the coordinates, a rigid support, a collimator thereon having a first coordinate position determining axis arranged to be positioned in alignment with the first predetermined coordinate, a second rigid support, a reference table adjustably mounted on the second support for rotation in azimuth about a vertical axis, vertical adjustment, and horizontal shifting adjustment in transverse intersecting directions, means on the support for leveling the reference table, rotating the same in azimuth and adjusting the same in transverse intersecting horizontal directions, a sighting telescope fixed on the table having a first coordinate position determining sighting axis disposed perpendicular to the vertical axis aforesaid and parallel to one of the transverse adjustment directions of the reference table, for sighting toward the collimator while adjusting the reference table in azimuth, elevation and in said transverse adjustment directions to dispose the coordinate position determining axis of the telescope coincident with the first coordinate, optical second coordinate position reflecting means carried by the reference table having a second coordinate position determining axis disposed in predetermined angular relation to the telescope sighting axis to dispose the same in coincident alignment with the second coordinate when the telescope sighting axis is coincident with the collimator axis for reflecting a collimated line of sight at a predetermined angle to determine the position and direction of a second coordinate, linear measuring means carried by the reference table and extensible in parallel relation to the telescope sighting axis for measuring the distance between a selected zero point on the first coordinate adjacent the collimator and the position of the second coordinate position determining axis of the optical reflecting means, said linear measuring means comprising a graduated flexible measuring tape, and uniform tension applying means between the tape and the table for uniformly tensioning the tape.

5. In a coordinate position setting and measuring apparatus for determining the positions in space of a plurality of predetermined intersecting coordinates and reference points along the coordinates, a rigid support, a collimator thereon having a first coordinate position determining axis arranged to be positioned in alignment with the first predetermined coordinate, a second rigid support, a reference table adjustably mounted on the second support for rotation in azimuth about a vertical axis, vertical adjustment, and horizontal shifting adjustment in transverse intersecting directions, means on the support for leveling the reference table, rotating the same in azimuth and adjusting the same in transverse intersecting horizontal directions, a sighting telescope fixed on the table having a first coordinate position determining sighting axis disposed perpendicular to the vertical axis aforesaid and parallel to one of the transverse adjustment directions of the reference table, for sighting toward the collimator while adjusting the reference table in azimuth, elevation, and in said transverse adjustment directions to dispose the coordinate position determining axis of the telescope coincident with the first coordinate, optical second coordinate position determining reflecting means carried by the reference table having a second coordinate position determining axis disposed in predetermined angular relation to the telescope sighting axis to dispose the same in alignment with the second when the telescope sighting axis is coincident with the collimator axis, for projecting a collimated line of sight from the collimator coincident with said second coordinate determining axis determining the position and direction of the second coordinate, linear measuring means carried by the reference table and extensible in parallel relation to the telescope sighting axis for measuring the distance between a selected zero point on the first coordinate adjacent the collimator and the position of the second coordinate position determining axis of the optical reflecting means, said linear measuring means comprising a graduated flexible measuring tape, and microscope means fixed relative to the reference table for observing the linear measuring graduations on the tape to determine the distance from the second coordinate to the zero point on the first coordinate.

6. In a coordinate position setting and determining apparatus for determining the positions of a plurality of predetermined intersecting coordinates and reference points along the coordinates, a rigid support, a collimator thereon having a first coordinate position determining axis arranged to be positioned in alignment with the first predetermined coordinate, a second rigid support, a reference table adjustably mounted on the second support for rotation in azimuth about a vertical axis, vertical adjustment, and horizontal shifting adjustment in transverse intersecting directions, means on the support for leveling the reference table, rotating the same in azimuth and adjusting the same in transverse intersecting horizontal directions, a sighting telescope fixed on the table having a first coordinate position determining sighting axis disposed perpendicular to the vertical axis aforesaid and parallel to one of the transverse adjustment directions of the reference table for sighting toward the collimator while adjusting the reference table in azimuth, elevation, and in said transverse adjustment directions to dispose the coordinate position determining axis of the telescope coincident with the first coordinate, optical second coordinate position determining reflecting means carried by the reference table having a second coordinate position determining axis disposed in predetermined angular relation to the telescope sighting axis to dispose the same in alignment with the second coordinate when the telescope sighting axis is coincident with the collimator axis, for projecting a collimated line of sight from the collimator coincident with the second coordinate determining axis, determining the position and direction of a second coordinate, linear measuring means carried by the reference table and extensible in parallel relation to the telescope sighting axis for measuring the distance between a selected zero point on the first coordinate axis adjacent the collimator and the position of the second coordinate position determining axis of the optical reflecting means, said measuring means comprising a graduated flexible measuring tape, and tape reel means carried by the reference table and rotatable in a vertical plane parallel to the first coordinate determining axis aforesaid, and a third coordinate position and direction determining means carried by the reference table and movable parallel to the second coordinate axis for determining the location of reference points along the second coordinate and means on the movable means last mentioned for determining the location of a third coordinate.

7. In an apparatus for determining the relative locations in space of a plurality of intersecting coordinates and distances along said coordinates, a first collimator having a coordinate position determining axis, a rigid support therefor, for positioning the collimator axis to determine the location in space of the first coordinate, a second rigid adjustable support means, a reference table horizontally adjustable thereon, means operable to level the adjustable support means and table, and to adjust the same vertically, adjusting means between the adjustable support means and the reference table for adjusting the same about an axis perpendicularly to the horizontal adjustment plane of the reference table, transverse horizontal adjusting means between the support means and the table, a sighting telescope fixed on the reference table having a sighting axis disposed in a plane parallel to the horizontal adjustment plane of the reference table in a vertical plane parallel to one of the transverse adjustment directions of the table, whereby the telescope sighting axis is adjustable into alignment with the collimator coordinate position determining axis, second coordinate determining means mounted on the table in predetermined oriented relation to the telescope axis including rigidly mounted optical means having a second coordinate position determining axis for determining the location of a second coordinate relative to the position of the telescope sighting axis, extensible measuring means carried by the reference table below the telescope sighting axis and extensible in parallel relation thereto toward the collimator, for measuring the distance of the second coordinate determining axis aforesaid of the rigidly mounted optical means from any selected or predetermined zero point along the first coordinate, third coordinate position determining means movably carried by the reference table to move in a vertical plane parallel to the second coordinate determining axis of the rigidly mounted optical means, linear graduated measuring and adjusting means between the reference table and the third coordinate position determining means for measuring distance between the telescope sighting axis and the third coordinate position determining means, and position locating means vertically adjustable along the third coordinate position determining means, including linear measuring means for measuring distance along the third coordinate between the second coordinate position determining axis aforesaid and the position locating means.

8. In a coordinate setting and measuring apparatus a horizontal reference table, adjustable supporting means therefor for leveling the reference table and adjusting the same vertically, means for adjusting the table in azimuth about an axis perpendicular to the reference table, means for adjusting the table on the supporting means in transverse directions in a horizontal plane, telescope means having a sighting axis for determining the reference position in azimuth and elevation of a first predetermined coordinate, said telescope means being fixed on the table with its sighting axis parallel to the transverse adjustment plane of the table and in a vertical plane parallel to one of the aforesaid transverse adjustment directions of the table, penta-prism means displaceably mounted on and rigidly connectible to the reference table with its light entrance axis in parallel alignment with the telescope sighting axis, including a penta-prism and mounting means for the penta-prism for displacing the same out of said telescope sighting axis while sighting through the telescope toward a predetermined point on the first coordinate, extensible graduated measuring means carried by the table extensible in a vertical plane including the telescope sighting axis for measuring distance parallel to the telescope sighting axis in a vertical plane from some point along the telescope axis to the light exit axis of the penta-prism means.

9. Apparatus as claimed in claim 8 in which the penta-prism has a light entrance axis and a light exit axis, and the mounting means is on the reference table and adjustably supports the penta-prism for rotation about an axis parallel to the telescope sighting axis to adjust the direction of the light exit axis in a plane perpendicular to its entrance axis.

10. In a coordinate position setting and measuring apparatus a collimator having a first coordinate position determining axis, including rigid means for supporting the same horizontally, track means extending substantially parallel to the collimator first coordinate position determining axis, a portable support movable along the track means, a reference table adjustably carried by the portable support and having a reference surface, adjustment means on the portable support for leveling the reference table, elevating the reference table, adjusting the reference table in azimuth about an axis perpendicular to the reference surface and adjusting the reference table in transverse directions parallel to the reference surface, optical sighting means rigidly carried by the table having a first coordinate position and direction determining sighting axis extending in a horizontal plane parallel to the reference surface and in a vertical plane parallel to one of the transverse adjustment directions of the table, optical second coordinate determining means rigidly mounted on the reference table in a predetermined angular relation to the first coordinate direction sighting axis of the optical sighting means and having a second coordinate position and direction determining axis, measuring tape means, a tape reel therefor carried by the reference table for rotation in a plane including the first coordinate position and direction determining sighting axis aforesaid, including measuring tape on the reel extensible toward the collimator for measuring distance between any zero point along the first coordinate direction sighting axis and the second coordinate direction determining axis aforesaid, and means between the tape reel and the reference table for maintaining uniform tension on the measuring tape.

11. In a coordinate setting apparatus a collimator having a first coordinate position determining axis, including rigid means for supporting the same horizontally, track means extending substantially parallel to the collimator first coordinate position determining axis, a portable support movable along the track means, a reference table adjustably carried by the portable support and having a reference surface, adjustment means on the portable support for elevating and leveling the reference table, and for adjusting the reference table in azimuth about an axis perpendicular to the reference surface, and for adjusting the reference table in transverse directions parallel to the reference surface, optical sighting means rigidly carried by the table having a first coordinate position determining sighting axis extending in a horizontal plane parallel to the reference surface and in a vertical plane parallel to one of the transverse adjustment directions of the table, second coordinate position determining means carried by the table comprising a carriage mounted on the reference table for adjustment in a plane parallel to the reference surface and perpendicular to the first coordinate position determining axis of the optical sighting means aforesaid, elongated third coordinate direction determining guide means fixed on said carriage and extending in a third coordinate direction, perpendicular to the first and second coordinate position and direction determining sighting axes aforesaid, position locator means adjustable along the guide means and graduated measuring means between the guide means and the locator means for determining predetermined reference points along a third coordinate.

12. In a coordinate direction and reference point locating apparatus, a fixed support, first coordinate direction determining collimator means carried by the support having a first coordinate direction determining axis for indicating the direction and position in space of a first horizontal coordinate, a portable support, a reference table adjustably carried by said portable support for leveling adjustments, vertical adjustments, azimuth adjustments about a vertical axis, and transverse adjustments in a horizontal plane, means for adjusting the reference table vertically, transversally in a horizontal plane, in azimuth about a vertical axis, and leveling the same, first coordinate position locating means rigidly carried by the reference table having a first coordinate sighting axis extending parallel to the transverse adjustment plane of the reference table and in a vertical plane parallel to one of the transverse adjustments of the reference table for sighting alignment with the axis of the first coordinate direction determining means, a carriage mounted above the reference table for horizontal adjustment in a plane perpendicular to the sighting axis of the coordinate position locating means, vertically disposed guide rail means fixedly carried by said carriage having a third coordinate position determining reference face formed thereon extending in a vertical plane perpendicular to the sighting axis of the first coordinate position locating means and perpendicular to the direction of movement of the carriage, reference position locator means slidably mounted on said guide rail means, fine adjustment and measuring means between the reference table and the carriage for adjusting the carriage to position the third coordinate determining reference face at a predetermined horizontal distance from the first coordinate sighting axis of the first coordinate position determining means.

13. Apparatus as claimed in claim 12, in which the first coordinate position locating means comprises a telescope rigid on the reference table with a sighting axis extending away from the table parallel to the transverse adjustment planes of the reference table, and includes adjustable reflector means movably mounted relative to said reference table and adjustable for shifting movement into and out of the sighting telescope axis, said adjustable reflector means having penta-prism means therein with a light entrance axis disposed in alignment with the sighting telescope axis when in operative position and a light exit axis in a horizontal plane parallel to the horizontal adjustment direction of the carriage, for reflecting the first coordinate direction determining axis of a collimator image from the first coordinate direction determining collimator means when the collimator axis is coincident with the telescope axis, at an angle of 90° in a horizontal plane parallel to a second coordinate position determining direction parallel to the direction of said carriage movement above the table.

14. Coordinate setting and reference point locating apparatus as claimed in claim 12, including a second, cooperating, coordinate setting device for determining the position of reference points adjacent a third coordinate located at a distance from the first coordinate exceeding the length of adjustment of the carriage on the reference table aforesaid, said second device comprising a rigid support, a reference table adjustable thereon, means for adjusting the table in elevation, azimuth, and in transverse horizontal directions, a sighting telescope fixed on the last mentioned table having a sighting axis parallel to the horizontal adjustment planes of the last mentioned table and parallel to a vertical plane passing through one of the transverse adjustment planes of the last mentioned table for determining the direction of a second coordinate, uniformly tensioned measuring tape means carried on last mentioned reference table, extensibly parallel to the last mentioned telescope sighting axis for measuring between its supporting reference table and the sighting axis of the first coordinate position locating means, and third coordinate position and direction determining means movably carried by the last mentioned reference table for movement in predetermined angular relation to the last mentioned telescope axis for determining the direction and position of a third coordinate relative to the sighting axis of the first coordinate position locating means, measuring and adjusting means between the last mentioned reference table and the third coordinate direction and position determining means to dispose the same in predetermined spaced relation to the first coordinate axis, reference position determining means on the third coordinate position and direction determining means movable in a vertical plane at right angles to the last mentioned telescope sighting axis for determining reference points along a third coordinate, and graduated scale means and slow motion adjusting means for adjusting the reference position determining means vertically relative to the last mentioned telescope sighting axis to locate predetermined points on a third coordinate relative to the last coordinate as determined by the position of the second mentioned telescope axis.

15. In a coordinate setting apparatus of the class described, a support, a sighting telescope rigidly mounted thereon having a first coordinate position determining axis, means for adjusting the support to locate the telescope sighting axis coincident with a first coordinate, penta-prism means rigidly carried by the support having a light entrance axis coincident with the telescope sighting axis and a light exit axis disposed in 90° angular relation to the telescope sighting axis, penta-prism mounting means movably carried by the support and shiftable thereon to and from operative position with its light entrance axis in the telescope sighting axis, linear measuring means carried by the support and extensible in a direction parallel to the telescope sighting axis for measuring distance from a given zero point along the telescope sighting axis to the light exit axis of the penta-prism means to determine the point of intersection of a second predetermined coordinate with the first coordinate, said linear measuring means including a measuring tape and a tape reel therefor mounted on the support, uniform tensioning means between the support and tape reel for maintaining uniform pull on the tape, third coordinate position determining means on the support movable in a vertical plane parallel to the light exit axis of the penta-prism means for determining the location and direction of a third given coordinate relative to the sighting axis of the telescope, and the light exit axis of the penta-prism, and reference position locating means adjustable vertically on the third coordinate position determining means for locating reference points along the third given coordinate or offset relative thereto.

16. In a coordinate setting and measuring apparatus, a portable support, a reference table thereon, having a reference surface, adjusting means on the support for leveling the support, adjusting the support vertically to position the reference surface at a predetermined elevation in a horizontal plane, azimuth adjusting means on the support for rotating the table in a plane parallel to the reference surface, transverse adjustment means on the support for adjusting the reference table in transverse intersecting directions in a plane parallel to reference surface, optical sighting means fixed relative to the reference table having a sighting axis extending parallel to the reference surface in a transverse plane parallel to one of the transverse adjustment directions of the reference table, for sighting toward a collimator fixed at a distance from the reference table having a first coordinate determining axis with optical target means for determining said axis in space, penta-prism means movably mounted on the reference table between an operative position in alignment with the sighting axis of the optical sighting means between the latter and the collimator and an inoperative position out of alignment with the optical means sighting axis, said penta-prism means having a light entrance axis facing toward the collimator when in an operative position after the reference table has been adjusted to align the optical means sighting axis with the coordinate determining axis of the collimator, and having a light exit axis extending in a plane perpendicular to the sighting axis of the optical sighting means, whereby the collimator coordinate determining axis as determined by the collimator is bent 90° by the penta-prism means to determine the location and direction of a second coordinate relative to the collimator axis, and means for adjusting the position of the penta-prism means about its light entrance axis to determine the direction of the light exit axis and coincident direction of the second coordinate in a plane perpendicular to the first coordinate sighting axis of the optical sighting means.

17. In a coordinate position and direction determining apparatus, a portable support, means for fixing the support in a predetermined rigid stationary position, adjustable supporting means on the portable support adjustable in transverse intersecting horizontal directions and in azimuth about a vertical axis, optical sighting means having a first coordinate position determining sighting axis disposed in a vertical plane parallel to one of the transverse adjustment directions aforesaid and in a horizontal plane parallel to the aforesaid transverse intersecting horizontal adjustment directions of the adjustable support, a carriage adjustable on the adjustable support in a horizontal plane transverse to the sighting axis of the optical sighting means in the direction of a second coordinate, third coordinate position determining means on said carriage having a third coordinate direction determining means, and adjusting means between the adjustable support and the carriage for adjusting the distance between the sighting axis of the optical sighting means and the said third coordinate direction determining means.

18. Apparatus as claimed in claim 17 including optical means on the carriage having a sighting axis for sighting along and determining the position of a third predetermined coordinate perpendicular to the first coordinate determined by the first optical means sighting axis and perpendicular to the second coordinate direction as determined by the direction of adjustment movement of the carriage on the adjustable support and extensible measuring means adjacent the third coordinate sighting axis for measuring points along the third coordinate relative to the position of the second coordinate and in offset relation to the third coordinate.

19. Apparatus as claimed in claim 18 in which means are provided for rotatably mounting the optical sighting means carried by the carriage about an axis perpendicular to the sighting axis of the optical sighting on the adjustable support and perpendicular to the adjustment direction of the carriage on the adjustable support.

20. In a coordinate direction and reference point locating apparatus, a fixed support, a first coordinate determining means carried by the support having a first coordinate determining axis for indicating the direction and position in space of a first horizontal coordinate, a portable support, a reference table adjustably carried by said portable support for leveling adjustments, vertical adjustments, azimuth adjustments about a vertical axis and transverse adjustments in a horizontal plane, means for leveling the reference table and adjusting the same vertically, transversely and in azimuth, a first coordinate position locating and sighting means fixedly carried by the reference table having a first coordinate sighting axis extending parallel to the transverse adjustment plane of the reference table and in a vertical plane parallel to one of the transverse directions of the reference table, penta-mirror reflecting means mounted on the reference table in front of the sighting means for reflecting a point on the line of sight passing through the first coordinate sighting axis of the sighting means, from the first coordinate determining means in coincident relation to the sighting axis of the first coordinate position locating sighting means, said penta-mirror reflecting means having a sight opening therethrough coincident with the sighting axis of the first coordinate position locating sighting means whereby a line of sight may be established directly through the sighting opening in the penta-mirror reflecting means and a second reflected line of sight at 90° thereto can be simultaneously established in intersecting relation to the coordinate determining axis of the first coordinate determining means on the fixed support.

21. In a coordinate determining apparatus, a fixed horizontal collimator having a coordinate determining axis for determining the position in space of a first horizontal coordinate, a spaced support having a first coordinate sighting telescope disposed horizontally thereon for sighting toward the collimator to determine the position of the spaced support with the axis of the telescope coincident with the collimator coordinate determining axis, and penta-mirror reflecting means disposed on this support between the telescope and the collimator, in the coordinate determining axis thereof, formed with a sighting aperture therethrough for sighting the collimator directly through the telescope and simultaneously establishing a reflected line of sight through the penta-mirror reflecting means at 90°, for establishing the direction and position of a second coordinate, and measuring means carried by the penta-mirror reflecting means for measuring linear distance along said second coordinate.

22. Apparatus as set forth in claim 21 including rotary mounting means on the spaced support for the penta-mirror reflecting means for providing rotation of the penta-mirror reflecting means about an axis coincident with the telescope sighting axis, for establishing polar coordinate determining sighting axis through the telescope axis at 90° thereto, and the measuring means which is carried by the penta-mirror reflecting means is rotatable therewith and extensible parallel to the polar coordinate determining sighting axis for measuring distance along said polar coordinates from the telescope sighting axis as a center.

OLIVER S. READING.

REFERENCES CITED

The following references are of record in the file of this patent:

UNITED STATES PATENTS

| Number | Name | Date |
|---|---|---|
| 854,310 | Robertson | May 21, 1907 |
| 1,434,209 | Hort | Oct. 31, 1922 |
| 1,667,995 | Steinle | May 1, 1928 |
| 1,959,551 | Schubert | May 22, 1934 |
| 2,198,757 | Bohrn et al. | Apr. 30, 1940 |
| 2,267,649 | Graves | Dec. 23, 1941 |
| 2,342,828 | Armitage et al. | Feb. 29, 1944 |
| 2,387,440 | Guellich et al. | Oct. 23, 1945 |
| 2,471,050 | Turrettini | May 24, 1949 |